United States Patent
Larsen

Patent Number: 6,079,146
Date of Patent: Jun. 27, 2000

[54] FISHING LURE SCENT STRIP

[75] Inventor: Walter C. Larsen, Edina, Minn.

[73] Assignee: Mathew A. McPherson, Norwalk, Wis.

[21] Appl. No.: 09/016,155

[22] Filed: Jan. 30, 1998

[51] Int. Cl.$^7$ .............................................. A01K 85/00
[52] U.S. Cl. .............................................................. 43/42.06
[58] Field of Search .............................. 43/42.06, 42.33, 43/42.53

[56] References Cited

U.S. PATENT DOCUMENTS

| | | | |
|---|---|---|---|
| 3,666,669 | 5/1972 | Noordam, Jr. | 242/132 |
| 3,722,128 | 3/1973 | Tremblay | 43/42 |
| 3,769,739 | 11/1973 | Pitts | 43/42 |
| 3,822,211 | 7/1974 | Morton | 252/132 |
| 4,047,317 | 9/1977 | Pfister | 43/42 |
| 4,133,134 | 1/1979 | Cheng | 43/42 |
| 4,602,453 | 7/1986 | Polley | 43/44 |
| 4,712,325 | 12/1987 | Smith | 43/42 |
| 4,726,138 | 2/1988 | Hurt | 43/45 |
| 4,742,638 | 5/1988 | Vobejda | 43/42 |
| 4,744,167 | 5/1988 | Steele | 43/42 |
| 4,777,757 | 10/1988 | de Marees van Swinderen | 43/41 |
| 4,787,167 | 11/1988 | Wroclawski | 43/17.6 |
| 4,799,328 | 1/1989 | Goldman | 43/42 |
| 4,823,497 | 4/1989 | Pierce | 43/17 |
| 4,856,223 | 8/1989 | Evans | 43/42 |
| 4,875,305 | 10/1989 | Bridges | 43/42.06 |
| 4,881,340 | 11/1989 | Davis | 42/42 |
| 4,914,849 | 4/1990 | Hook | 43/42 |
| 4,953,319 | 9/1990 | Kasper et al. | 43/42 |
| 4,962,609 | 10/1990 | Walker | 46/42 |
| 4,964,235 | 10/1990 | Gruelle | 43/42 |
| 4,972,623 | 11/1990 | Delricco | 43/17 |
| 5,018,297 | 5/1991 | Kennedy, Jr. | 43/42 |
| 5,063,703 | 11/1991 | Riley | 43/42 |
| 5,142,811 | 9/1992 | Freeman | 43/42 |
| 5,170,579 | 12/1992 | Hollinger | 43/42 |
| 5,172,510 | 12/1992 | Lovell, Jr. | 43/42 |
| 5,321,906 | 6/1994 | Bommarito | 43/44 |
| 5,327,670 | 7/1994 | Tallerico | 43/42 |
| 5,355,616 | 10/1994 | Parker | 43/43 |
| 5,415,862 | 5/1995 | Bethshears et al. | 424/410 |
| 5,517,781 | 5/1996 | Paoletta, Jr. | 43/42 |
| 5,517,782 | 5/1996 | Link et al. | 43/42 |

*Primary Examiner*—Thomas Price
*Attorney, Agent, or Firm*—Vidas, Arrett & Steinkraus P.A.

[57] ABSTRACT

A fishing lure scent strip formed of a waterproof tape impregnated with a material having a scent for attracting fish is disclosed as well as uses for the same. An improved scented fishing lure comprising a fishing lure, spoon, spinner, sinker or hook with one or more pieces of the inventive fishing lure scent strip attached thereto is also disclosed.

38 Claims, 1 Drawing Sheet

FISHING LURE SCENT STRIP

BACKGROUND OF THE INVENTION

This invention relates to a fishing lure scent strip that appeals to the sensory system of fish and fish lures including the fishing lure scent strip..

Over the years, the field of fishing has advanced from the use of live bait to the use of artificial lures. Recently, a great deal of attention has been focussed on the development of scents and scent delivery systems to address the highly developed sensory system in fish.

A recent In-Fisherman subscriber survey conducted by Added Value Inc. revealed that 70% of respondents used scent enhanced baits or attractants in the 12 months prior to the survey. Moreover, scent enhanced baits were used by 79% of those who fish for bass most often. Among the brands used most often by respondents were Berkeley™, Fish Formula™, Dr. Juice™ and Ultimate Baitmate™.

To date, a number of different types of scented lures have been disclosed including lures formed from fish food which provides a scent to attract fish (U.S. Pat. No. 5,063,703 to Riley), lures formed of materials that have been intermixed with scents such as U.S. Pat. No. 4,953,319 to Kasper et. al. (a lure with a fish oil intermixed with the plastic formulation from which the lure made) and U.S. Pat. No. 4,875,305 to Bridges (a slowly dissolving lure made of a polymer with an fish scent attractant impregnated therein) and lures having inner receptacles containing scented substances or fluids such as U.S. Pat. No. 5,170,579 to Hollinger (a lure comprising a pouch for receiving bait or scented substances), U.S. Pat. No. 5,321,906 to Bommarito (a fishing scent delivery system comprising a bladder which releases a fishing scent material in the vicinity of a fishing lure) and U.S. Pat. No. 5,517,781 to Paoletta, Jr. (a lure having a reservoir from which a scented fluid is dispensed). Other types of scent bearing lures include those in which scent impregnated materials not integral to the lure structure are included such as U.S. Pat. No. 4,962,609 to Walker (a lure comprising an absorbent fibrous material impregnated with fish attractant), U.S. Pat. No. 5,018,297 to Kennedy, Jr. (a fishing lure with a cellular, porous scent receiving material inserted into a cylinder within the lure) and U.S. Pat. No. 5,142,811 to Freeman (a fishing lure having a fish attractant dispenser such as a scented pipe cleaner inserted into an inner casing).

Unfortunately, lures made of materials with scents impregnated therein have limited lifetimes. Over time, the intensity of the scent diminishes. Similarly, lures comprising reservoirs or compartments containing scented fluids or other scented materials suffer from the same fate, unless the reservoirs or containers are replenished. Finally, it may be desirable to impart a scent to lures which have other desirable characteristics including color, shape and noise-making ability but are lacking in scent.

It is an object of the present invention to provide a fishing lure scent strip. It is also an object of the present invention to provide a reusable fishing lure to which a scent has been applied via application of a scented waterproof tape which overcomes the abovementioned inadequacies in the prior art. For the purposes of the present application, the term 'waterproof tape' shall denote a tape with an adhesive waterproof back.

SUMMARY OF THE INVENTION

The invention provides a novel fishing lure scent strip and a method of making the same.

The invention further provides a fishing lure with one or more pieces of a waterproof substrate carrying a scent producing substance for attracting fish, adhered to the body of the lure.

The invention further provides a method for retrofitting a used fish lure by applying to the lure a tape impregnated with a material having a fish attracting scent.

The invention also provides a method for retrofitting a used fish lure by applying a jacket over the used fish lure. The jacket, a fishing lure scent strip, is formed of waterproof tape impregnated with a material having a scent for attracting fish thereto and contoured to the body of the lure. Holes are provided in the jacket for any hooks or other protuberances emerging from the lure.

The invention further pertains to a fishing lure scent strip formed of a waterproof tape impregnated with a material having a scent for attracting fish thereto, the scent optionally sealed into the tape for later release into water.

Finally, the invention pertains to a lure enhancement kit comprising one or more pieces of the inventive fishing lure scent strip.

DETAILED DESCRIPTION OF THE INVENTION

The fish attracting scent may comprise an amount of a fish product such as fish meal, fish flavoring or fish oil, a fisherman's soap such as that described in U.S. Pat. No. 3,666,669 to Noordam, Jr or U.S. Pat. No. 3,822,211 to Morton, both of which are incorporated herein by reference, a fish bait mixture as described in U.S. Pat. No. 5,063,703, incorporated herein by reference, combinations of the above or any other product having scent that is known or believed to attract fish such as Dr. Juice™, Berkelely™, Fish Formula™, Ultimate Baitmate™, WD-40™ and mixtures thereof.

The fishing lure scent strip of the present invention includes a waterproof substrate preferably a waterproof tape to which a scent producing substance may be applied. Preferably, the tape will hold the scent for at least ½ hour or longer. Suitable waterproof tapes useful in the practice of the present invention include absorbent cloth based tapes and absorbent polymer based tapes, for example, 13 mil or less polyurethane open cell foam tapes with adhesive backings, such as Medifix™, manufactured by Medifix™ Adhesive Products, Limited, Bedfordshire, England, although any other waterproof tape, especially absorbent tape may be used as well.

It is also important that the tape be very thin and/or lightweight so as not to substantially affect the balance of the lure to which the tape is attached. Preferably, the tape will have minimal effect on the balance and/or hydrodynamics of the lure.

The tape should be formed of a material which may be easily shaped and cut to enable the manufacture of different shapes and sizes such as dots, strips and any other suitable shapes. The tape may also be formed as a sheet of kiss-cut. The kiss-cut sheet consists of adhesive tape pre-cut into one or more desired shapes on a substrate. The pre-cut shapes may be peeled off the substrate.

Also, the tape must be able to adhere to plastics and metals such as those from which fish lures are built.

In the practice of the invention, the fish attracting scent is applied to the tape so that the scented material is absorbed or otherwise impregnated into the tape. The scented material may be applied to the tape by spraying the tape with the material, painting the material onto the tape, pressing the material into the tape, soaking the material into the tape or any other suitable means. In particular, the material having the fish attracting scent may be embedded in a slow release polymer applied to the tape so that the scented material is released over a desired period of time. The thus formed fishing lure scent strip is then applied to a fishing lure as shown in FIGS. 1 and 2.

Figure 1:
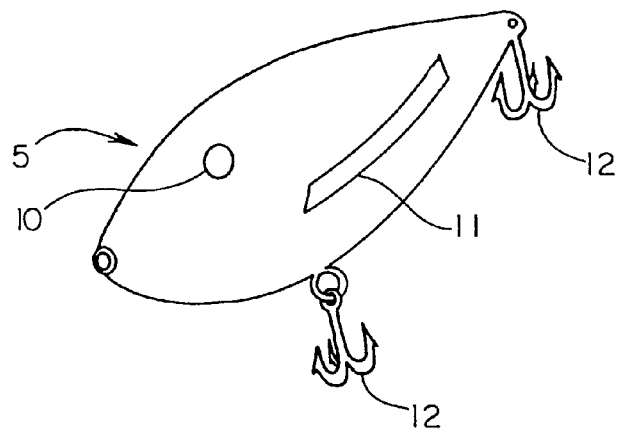
FIG. 1 shows a side view of one embodiment of the inventive fish lure.
Figure 2:
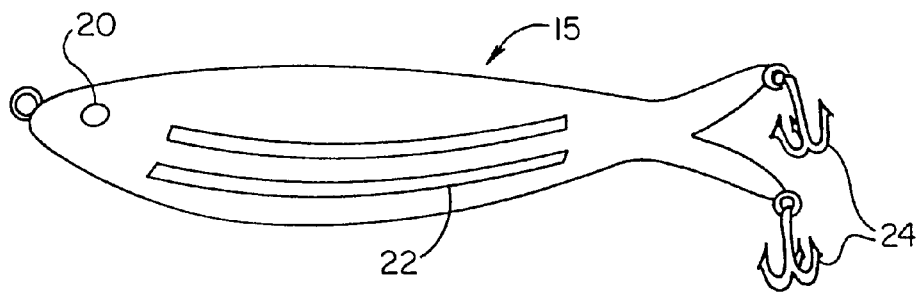
FIG. 2 shows a side view of another embodiment of the inventive fish lure.

In FIG. 1, the fish lure, shown generally at 5 has a dot shaped fishing lure scent strip 10 placed thereon to simulate an eye. Lure 5 further has an additional stripe of fishing lure scent strip 11 placed thereon to simulate the lateral marking of a fish. Hooks 12 are shown attached to lure 5. In FIG. 2, a fish lure shown generally at 15 has a dot shape fishing lure scent strip 20 placed thereon to simulate an eye and two stripes of fishing lure scent strip 22 to simulate lateral markings. Of course, the lure also has hooks 24. FIGS. 1 and 2 are meant to be illustrative only. It will be recognized that other patterns of fishing lure scent strip may be applied to the lure as well. The dots and stripes may be fluorescent, brightly colored, metallic colored, for example, to resemble shiny aluminum or metallic flakes or otherwise colored so as to simulate a fish or attract a fish.

The inventive fishing lure scent strip may be shaped to fit a hook, sinker spinner or a spoon. In use, the fishing lure scent strip may be wrapped around the hook or sinker or placed on the concave backside of a spinner or spoon.

In another embodiment, the present invention is directed to a method of preparing a scented fish lure from a fish lure having a body by applying fishing lure scent strip in the form of a waterproof tape impregnated with a material having a scent for attracting fish to the body of the lure.

In yet another embodiment, the present invention is directed to a method for retrofitting a used fish lure by applying to the lure an inventive fishing lure scent strip.

In yet another embodiment, the present invention is directed to a fishing lure scent strip including a waterproof tape impregnated with a material having a fish attracting scent for use with a fish lure. Such a fishing lure scent strip may be provided in bulk or as individual strips or dots to be applied to a lure, hook, sinker, spinner or spoon. Such a strip may also be provided as cut outs on kiss-cut (adhesive tape pre-cut into one or more desired shapes on a substrate). The fishing lure scent strip may be suitably colored or fluorescent so as to better simulate a fish or provide further attraction to the fish.

Figure 3:
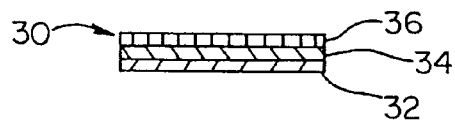
FIG. 3 illustrates one construction for an inventive fishing lure scent strip comprising an absorbent layer with a fish scent absorbed therein and a release layer for sealing in the scent.

The inventive fishing lure scent strips may be stored under vacuum or under an inert gas until use or may further have the scent sealed therein by application of a water soluble sealant material over the scent. The sealant material dissolves on introducing the tape into water thereby allowing for release of the scent. The scent may also be sealed in the adhesive tape via the use of an additional removable layer of a substrate resting above the scent containing material. In such an embodiment, as depicted in FIG. 3, the fishing lure scent strip shown generally at 30 comprises an adhesive layer 32, an absorbent layer 34 and a release layer 36. Absorbent layer 34, resting atop adhesive layer 32 is impregnated with a fish scent and release layer 36 is placed thereon to seal in the fish scent prior to use. In use, release layer 36 is peeled off of absorbent layer 34 after fishing lure scent strip 30 has been applied to the lure and the lure placed on the fishing line. In this manner, not only is diffusion of the scent from the tape minimized but additionally, contamination of the lure with human scents is minimized. While any suitable release material may be used for the release layer it is preferable to use substrates including oriented polypropylene (OPP) films, siliconised OPP and polyester, silicon coated paper. Release layers having a slight tack may be used as well.

Figure 4:
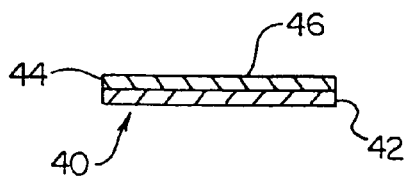
FIG. 4 illustrates one construction for an fishing lure scent strip comprising an absorbent layer with a fish scent absorbed therein and a release layer resting on the adhesive surface.

The fishing lure scent strips of the present application may also have an optional release coated layer adjacent to the waterproof adhesive. In one preferred embodiment, as illustrated in FIG. 4, the tape, used in the present invention and shown generally at 40 is a 13 mil or less polyurethane open cell foam tape with adhesive backing (such as Medifix™, Tape 40 has a release coated layer 42 adjacent to adhesive layer 44. Release coated layer 42 is removed from adhesive layer 44 prior to applying tape 40 to a lure. The fish scent is applied to tape surface 46 to form the inventive fishing lure scent strip.

While any suitable release coated material may be used for the release coated layer and optional release coated layers discussed above, it is preferable to use substrates including oriented polypropylene (OPP) films, siliconised OPP and polyester and silicon coated paper.

In yet another embodiment, the invention is directed to a lure enhancement kit adapted for use with a fish lure, the kit comprising an absorbent waterproof tape and one or more fish scents. Optionally, the kit may be comprised of several pieces of tape, each piece already impregnated with a scent. In this manner, the fisherman may choose from a wide array of fishing lure scent strips depending upon the particular fish being sought and ambient conditions. The kit may also contain a variety of shapes of tape ranging from different size strips to different diameter dots of tape. The tape may be provided in various shapes and sizes in kiss-cut form. Optionally, the kit may further contain a fish lure, hook, sinker, spoon or spinner..

The invention also provides a method for retrofitting a used fish lure by applying a molded jacket over the used fish lure. The jacket may be formed of any suitable material such as plastic and is patterned after a lure. The jacket further comprises waterproof tape impregnated with a material having a scent for attracting fish thereto and contoured to the body of the lure. Holes are provide in the jacket for any hooks or other protuberances emerging from the lure. The jacket is secured to itself to provide a worn lure with a new pattern. The jacket may be colored so as to resemble a fish, or otherwise attract a fish thereto. The use of fluorescent materials is also contemplated to attract the fish to the lure as are the use of metallic looking materials including materials which resemble shiny aluminum, or which resemble metallic flakes.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. An adhesive tape with a material having a fish attracting scent applied thereto for use with a fishing article selected from the group consisting of lures, spinners, spoons, hooks and sinkers the tape of thickness 13 mil or less.

2. The adhesive tape of claim 1 wherein the tape is a polyurethane based open cell foam with adhesive backing.

3. The adhesive tape of claim 1 wherein the tape is removable.

4. The adhesive tape of claim 1 wherein the scent is released over 1/2 hour or more.

5. The adhesive tape of claim 1, wherein the scent is sealed into the tape by application of a water soluble sealant material over the scent, the sealant material dissolving on introducing the tape into water thereby allowing for release of the scent.

6. The adhesive tape of claim 1 further comprising an adhesive layer, an absorbent layer and a release coated flexible substrate, the adhesive layer to be applied to a lure, the absorbent layer impregnated with the fish scent and the release coated flexible substrate serving to seal in the fish scent prior to use.

7. The adhesive tape of claim 6 wherein the release coated flexible substrate is selected from the group consisting of oriented polypropylene (OPP) films, siliconised OPP, polyester and silicon coated paper.

8. The adhesive tape of claim 1 wherein the tape has an appearance selected from the group consisting of colored appearances, fluorescent appearances, and metallic appearances.

9. The adhesive tape of claim 8 wherein the tape is colored to resemble a fish.

10. An improved scented fish lure comprising a fishing article selected from the group consisting of lures, spinner, spoons, sinkers and hooks with an adhesive tape of thickness 13 mil or less having a scent producing substance for attracting fish applied thereto, the tape adhered to the fishing article.

11. The scented fish lure of claim 10 wherein the scent is sealed into the tape by application of a water soluble sealant material over the scent, the sealant material dissolving on introducing the tape into water thereby allowing for release of the scent.

12. The scented fish lure of claim 10 wherein the tape is formed of a release coated flexible substrate, the adhesive layer to be applied to a lure, the absorbent layer impregnated with the fish scent and the release coated flexible substrate serving to seal in the fish scent prior to use.

13. The scented fish lure of claim 10 wherein the tape is applied to the lure so as to resemble the marking of a fish.

14. The scented fish lure of claim 10 wherein the appearance of the tape is selected from the group consisting of fluorescent appearances, colored appearances, and metallic appearances.

15. The scented fish lure of claim 10 wherein the tape is dot shaped.

16. The scented fish lure of claim 15 wherein the tape is applied to the lure so as to resemble fish eyes.

17. The scented fish lure of claim 10 wherein the tape is a polymer based waterproof tape.

18. The scented fish lure of claim 17 wherein the tape is a polyurethane based open cell foam with adhesive backing.

19. The scented fish lure of claim 10 wherein the tape is a cloth based waterproof adhesive tape.

20. The scented fish lure of claim 10 wherein the tape is absorbent.

21. The scented fish lure of claim 10 wherein the scent producing substance is painted onto the tape.

22. The scented fish lure of claim 10 wherein the scent producing substance is pressed into the tape.

23. The scented fish lure of claim 10 wherein the scent producing substance is soaked into the tape.

24. The scented fish lure of claim 10 wherein the scent producing substance is sprayed into the tape.

25. The scented fish lure of claim 10 wherein the scent is released over at least one-half hour or longer.

26. A method of preparing a scented fish lure from a fishing article selected from the group consisting of lures, sinkers, spoons, spinners and hooks comprising the steps of
   a) providing an adhesive tape having a thickness of 13 mil or less;
   b) providing a scent producing substance for attracting fish;
   c) providing a fishing article;
   d) applying the scent producing substance to the tape; and
   e) applying the tape to the fishing article.

27. The method of claim 26 wherein the scent is sealed into the tape by application of a water soluble sealant material over scent, the sealant material dissolving on introducing the tape into water thereby allowing for release of the scent.

28. The method of claim 26 wherein the tape is formed of a release coated flexible substrate, the adhesive layer to be applied to the lure, the absorbent layer impregnated with the fish scent and the release coated flexible substrate serving to seal in the fish scent prior to use.

29. The method of claim 28 wherein the waterproof substrate is an adhesive tape.

30. A lure enhancement kit adapted for use with a fish lure, the kit comprising an absorbent waterproof adhesive tape of thickness 13 mil or less and one or more fish scents.

31. A fish lure mold patterned after a fish lure, the mold having holes therein to accommodate any hooks emanating from the lure, comprising a waterproof adhesive tape bearing a fish attracting scent wherein in use the mold is placed over the fish lure and adhesively secured to itself to provide a worn lure with a new pattern.

32. The fish lure mold of claim 31 wherein the tape is of a thickness of 13 mil or less.

33. The fish lure mold of claim 32 wherein the scent is sealed into the tape.

34. An adhesive tape impregnated with a material having a fish attracting scent for use with a fishing article selected from the group consisting of lures, spinners, spoons, hooks and sinkers wherein the scent is sealed into the tape by application of a water soluble sealant material over the scent, the sealant material dissolving on introducing the tape into water thereby allowing for release of the scent.

35. An adhesive tape impregnated with a material having a fish attracting scent for use with a fishing article selected from the group consisting of lures, spinners, spoons, hooks and sinkers, the adhesive tape comprising an adhesive layer, an absorbent layer and a release coated flexible substrate, the adhesive layer to be applied to a lure, the absorbent layer impregnated with the fish scent and the release coated flexible substrate serving to seal in the fish scent prior to use.

36. An adhesive tape with a material having a fish attracting scent applied thereto for use with a fishing article selected from the group consisting of lures, spinners, spoons, hooks and sinkers.

37. The adhesive tape of claim 36 of thickness about 13 mil or less.

38. A lure enhancement kit adapted for use with a fish lure, the kit comprising an absorbent waterproof adhesive tape and one or more fish scents.

* * * * *